(12) United States Patent
Tsukada et al.

(10) Patent No.: US 8,890,516 B2
(45) Date of Patent: Nov. 18, 2014

(54) TENSION MEASUREMENT APPARATUS

(75) Inventors: Kazuhiko Tsukada, Kyoto (JP); Ippei Furukawa, Kasumigaura (JP); Toshiro Kido, Itami (JP); Masashi Oikawa, Itami (JP)

(73) Assignees: Sumitomo (SEI) Steel Wire Corp., Itami-shi (JP); Tokyo Rope Manufacturing Co., Ltd., Tokyo (JP)

( * ) Notice: Subject to any disclaimer, the term of this patent is extended or adjusted under 35 U.S.C. 154(b) by 297 days.

(21) Appl. No.: 12/864,768

(22) PCT Filed: Apr. 24, 2009

(86) PCT No.: PCT/JP2009/058135
§ 371 (c)(1),
(2), (4) Date: Jul. 27, 2010

(87) PCT Pub. No.: WO2009/133812
PCT Pub. Date: Nov. 5, 2009

(65) Prior Publication Data
US 2010/0315076 A1 Dec. 16, 2010

(30) Foreign Application Priority Data

Apr. 28, 2008 (JP) ................................. 2008-117010

(51) Int. Cl.
*G01B 7/24* (2006.01)
*G01R 33/18* (2006.01)
*G01L 5/10* (2006.01)

(52) U.S. Cl.
CPC ..................................... *G01L 5/102* (2013.01)
USPC .................. 324/209; 73/760; 73/763; 73/774

(58) Field of Classification Search
CPC ................... G01N 2203/0635; G01N 27/902; G01N 3/38
USPC ................. 324/221, 209, 338, 241; 505/231; 310/90.5; 335/284; 73/760, 763, 774
See application file for complete search history.

(56) References Cited

U.S. PATENT DOCUMENTS 2,305,416 A * 12/1942 Hansen, Jr. ................... 310/90.5
3,543,144 A * 11/1970 Walters et al. ................ 324/221

(Continued)

FOREIGN PATENT DOCUMENTS

JP 61-8377 3/1986
JP 61-258161 A 11/1986

(Continued)

OTHER PUBLICATIONS

Tcheslauski, G. V., Spatial filtering fundamentals, Apr. 28, 2008, ELEN4304/5365 DIP, p. 6.*

*Primary Examiner* — Huy Q Phan
*Assistant Examiner* — Giovanni Astacio-Oquendo
(74) *Attorney, Agent, or Firm* — Venable LLP; Michael A. Sartori; Tamatane J. Aga

(57) ABSTRACT

A tension measurement apparatus that can carry out tension measurement of superior reproducibility with high sensitivity even for a target object of a stranded wire structure is provided. A cylindrical magnetizer arranged to surround a portion of a long magnetic element that becomes the target object of measurement direct-current magnetizes the magnetic element in the longitudinal direction up to the range of approach to saturation magnetization. Using a Hall element (magnetic sensor) arranged in proximity to the magnetic element at the central region in the longitudinal direction of the magnetic domain, the spatial magnetic field intensity in the neighborhood of the surface of the magnetic element, greatly differing corresponding to stress variation, is detected. Based on the detection value, the tension acting on the magnetic element is measured. Accordingly, a measurement result of superior reproducibility with high sensitivity is obtained. The tension measurement apparatus is applicable even to a target object of a stranded wire structure.

4 Claims, 7 Drawing Sheets

(56) References Cited

U.S. PATENT DOCUMENTS

| | | | |
|---|---|---|---|
| 4,096,437 A * | 6/1978 | Kitzinger et al. | 324/227 |
| 4,142,409 A * | 3/1979 | Miura | 73/862.451 |
| 4,596,150 A | 6/1986 | Kuhr | |
| 4,659,991 A * | 4/1987 | Weischedel | 324/241 |
| 4,694,247 A * | 9/1987 | Meili et al. | 324/216 |
| 4,707,695 A * | 11/1987 | Takahashi et al. | 340/870.31 |
| 4,866,379 A * | 9/1989 | Odagawa et al. | 324/207.12 |
| 5,010,299 A | 4/1991 | Nishizawa et al. | |
| 5,414,353 A * | 5/1995 | Weischedel | 324/232 |
| 5,929,000 A * | 7/1999 | Hahakura et al. | 505/231 |
| 6,094,119 A * | 7/2000 | Reznik et al. | 335/284 |
| 6,172,501 B1 * | 1/2001 | Tsukada et al. | 324/227 |
| 6,265,863 B1 * | 7/2001 | Kaneko | 324/160 |
| 6,776,057 B1 | 8/2004 | May | |
| 7,038,445 B2 * | 5/2006 | Walters et al. | 324/240 |
| 7,537,388 B2 * | 5/2009 | Koike et al. | 384/448 |
| 2006/0202685 A1 * | 9/2006 | Barolak et al. | 324/221 |

FOREIGN PATENT DOCUMENTS

| | | |
|---|---|---|
| JP | 2-245629 A | 10/1990 |
| JP | 3-15731 | 1/1991 |
| JP | 2003-507700 T | 2/2003 |
| JP | 2006-300902 A | 11/2006 |
| JP | 2006-300902 A * | 11/2006 |
| WO | WO-01/13081 A1 | 2/2001 |

* cited by examiner (a)

(b)

TENSION MEASUREMENT APPARATUS

TECHNICAL FIELD

The present invention relates to a tension measurement apparatus measuring the tension acting on a magnetic element of a long length, utilizing the stress magnetic effect of a magnetic element.

BACKGROUND ART

For an apparatus to measure the tension on a long steel member such as the cable of a hanging structure, the tension member of a ground anchor and the wire rope of transport equipment, a load cell (strain gauge type, differential transformer type) having a hole at the center through which a steel member is passed, or a hydraulic pressure disk is often used. These apparatuses are used, located between an anchorage fastened to a chuck with the object to be measured passed through and a fixture attached to an end of the target object. Therefore, the measurement apparatus must be set at the time of installing the object that will be subsequently subjected to measurement. The conventional measurement apparatuses could not be applied to measuring the tension of a member that was already installed.

By employing the stress measurement method utilizing the stress magnetic effect appearing at a magnetic element such as of steel (the phenomenon of variation in magnetization by stress), the measurement apparatus can be installed at an arbitrary position of a long steel member that has already been installed to carry out tension measurement. One known stress measurement method utilizes the variation in the magnetic permeability of a magnetic element caused by stress. The target object is magnetized up to the range of approach to saturation magnetization (the region where the hysteresis loop of magnetization property is closed; "rotating magnetization region" in terms of magnetic physics), and an alternating magnetic field of small amplitude is applied. The amplitude of the magnetic flux density with respect to the alternating magnetic field is measured to obtain the magnetic permeability for evaluating the stress (refer to Patent Document 1). Another approach is proposed utilizing the phenomenon that the magnetic flux flowing towards space varies when the magnetic flux passing through the interior of a magnetic element changes by the stress. The stress is evaluated by measuring the density of the magnetic flux leaking out from the permanent magnet that magnetizes the measuring object to the space located opposite of the measuring object (refer to Patent Document 2).

PRIOR ART DOCUMENT

Patent Document

Patent Document 1: Japanese Patent Laying-Open No. 2-245629
Patent Document 2: Japanese Patent Laying-Open No. 2006-300902

DISCLOSURE OF THE INVENTION

Problems to be Solved by the Invention

The method disclosed in the aforementioned Patent Document 1 is disadvantageous in that sufficient sensitivity cannot be obtained since the variation in the magnetic permeability corresponding to the variation in stress is relatively small, and the amplitude of the alternating magnetic field must be restricted such that the magnetic field intensity does not fall out the range of approach to saturation magnetization. Further, since the eddy current generated in the cross section of the target object by the alternating magnetic field affects the magnetic permeability and conductivity, the measurement values of particularly strands and ropes based on a stranded wire structure having a plurality of filaments stranded are readily affected by the eddy current since the conductance in the circumferential direction varies depending upon the contacting state between the filaments. Thus, application of this method is difficult.

The method disclosed in the aforementioned Patent Document 2 has the target object magnetized by means of a permanent magnet. A general permanent magnet is not based on a specification that causes the target object to be magnetized up to the range of approach to saturation magnetization. Therefore, measurement is achieved with a relatively weak magnetic field (a region where the hysteresis loop is not closed). There was a problem that a measurement result of superior reproducibility cannot be obtained due to the influence of the history of magnetism and stress prior to measurement.

An object of the present invention is to provide a tension measurement apparatus that can carry out tension measurement of superior reproducibility with high sensitivity even on a target object of a stranded wire structure.

Means for Solving the Problems

To achieve the aforementioned object, a tension measurement apparatus of the present invention includes a cylindrical magnetizer arranged to surround a portion of a long magnetic element to direct-current magnetize the magnetic element in the longitudinal direction up to the range of approach to saturation magnetization, and a magnetic sensor arranged in proximity to the magnetic element at a central region in the longitudinal direction of a magnetic domain to detect a spatial magnetic field intensity in a neighborhood of a surface of the magnetic element. The tension acting on the magnetic element is measured based on the spatial magnetic field intensity detected by the magnetic sensor.

Namely, the tension measurement apparatus is configured to direct-current magnetize a portion of a long magnetic element that is the target object of measurement up to the range of approach to saturation magnetization, detect the spatial magnetic field intensity in the neighborhood of the surface of the magnetized site, and measure the tension acting on the magnetic element from the detected value. The reason why this configuration is employed will be described hereinafter.

FIG. 7 represents an example of the magnetization property of a steel wire in the longitudinal direction (the horizontal axis corresponds to the current value of the exciting coil, and is considered to be, but not strictly, the magnetic field intensity), and represents that the magnetization occurring at the steel wire (magnetic flux density corresponding to magnetization in the drawing) differs depending upon the stress, i.e. represents the stress magnetic effect of the steel wire. Therefore, when the stress varies under a constant bias magnetic field, that stress variation can be sensed as a change in the magnetic flux density. However, since a magnetic element such as of steel has hysteresis characteristics, the influence of the history of previous magnetism and stress will be encountered at the region where the bias magnetic field is weak and the hysteresis loop is not closed, as represented in FIG. 7, so that reproducibility in the relationship between stress and magnetization cannot be expected. In contrast, in the case where tension variation is repeatedly applied to the steel wire of FIG. 7 at the region where the hysteresis loop is closed, i.e. in the range of approach to saturation magnetization, the variation in the magnetization by stress has a reversible and substantially linear relationship, as shown in FIG. 8. Thus, the present invention is directed to obtaining a measurement result of superior reproducibility by magnetizing the target object up to the range of approach to saturation magnetization.

Further, since the eddy current generated at the target object will affect the measurement result at the time of applying alternating magnetic field as set forth above, generation of eddy current per se is suppressed by direct-current magnetizing the target object in the present invention. Thus, tension measurement can be achieved with sufficient reliability even for a target object of a stranded wire structure whose measurement result will readily vary under the effect of eddy current.

In order to measure the tension at high sensitivity, the length of the target object to be magnetized is shortened, and the spatial magnetic field intensity in the neighborhood of the surface of the magnetized site is detected. The mechanism allowing measurement of high sensitivity according to such a configuration will be described hereinafter.

FIG. 9 schematically represents a magnetic field caused by magnetization of a magnetic element. When the target object having a finite length is placed under an even external magnetic field $H_{ex}$ along the longitudinal direction, magnetization M occurs at the target object. The magnetization M leads to an N pole and S pole at the two ends of the target object, whereby a magnetic field $H_{demag}$ (a demagnetizing field) is developed in a direction opposite to that of external magnetic field $H_{ex}$. Therefore, the actual magnetization M occurring at the target object corresponds to just the effective magnetic field $H_{eff}=H_{ex}-H_{demag}$. The spatial magnetic field $H_{sf}$ along the surface of the target object at the center region in the longitudinal direction may be considered to be substantially equal to this effective magnetic field $H_{eff}$. Although depending upon the shape of the target object, demagnetizing field $H_{demag}$ is proportional to magnetization M of the target object. The proportional factor thereof (diamagnetic field factor) N is constant as long as the geometric shape and arrangement are determined (R. M. Bozorth: Ferromagnetism (D. van Nostrand Co., 1951). The diamagnetic field factor of a columnar shape magnetic element may be depicted as shown in FIG. 10.

Therefore, spatial magnetic field $H_{sf}$ in the neighborhood of the object surface can be represented by the following equation (1).

$$H_{sf} \approx H_{eff} = H_{ex} - H_{demag} = H_{ex} - N(M/\mu_0) \quad (1)$$

where $\mu_0$ is the magnetic permeability in vacuum. When the external magnetic field is constant ($H_{ex}$=const.) in equation (1) and magnetization varies as M→M+ΔM, the effective magnetic field, i.e. the spatial magnetic field in the neighborhood of the surface, is modified by just the amount represented by the following equation (2).

$$\Delta H_{sf} \approx \Delta H_{eff} = (-N/\mu_0)\Delta M \quad (2)$$

Assuming that this modification ΔM in magnetization is produced by stress, the stress variation will appear in a modification $\Delta H_{sf}$ of the spatial magnetic field in the neighborhood of the object surface as long as the diamagnetic field factor N is not zero. Furthermore, the modification $\Delta H_{sf}$ of the spatial magnetic field appears greater as diamagnetic field factor N is larger (referring to FIG. 10, as the length of the site to be magnetized becomes shorter). In this context, the present invention is directed to tension measurement of high sensitivity by taking out a large spatial magnetic field modification $\Delta H_{sf}$ corresponding to stress based on a configuration in which demagnetizing field $H_{demag}$ is great with a short magnetic domain. The length of the magnetic domain is desirably set to have a ratio equal to or less than 3 to the diameter of the target object. As the ratio of the length of the magnetic domain to the diameter of the target object becomes higher, the diamagnetic field factor N, and in turn the measurement sensitivity, will become lower (for example, when this ratio is 5, diamagnetic field factor N becomes approximately ½ times that of the ratio 3). It will become difficult to obtain sensitivity sufficiently adaptable to practical use if the ratio exceeds 3.

The magnetic sensor is desirably arranged at the inner circumferential side of the cylindrical magnetizer. As the magnetic sensor is located closer to the surface of the magnetic element, the measurement value of spatial magnetic field $H_{sf}$ by the magnetic sensor will properly reflect the behavior of effective magnetic field $H_{eff}$ that varies greatly under the effect of demagnetizing field $H_{demag}$. Therefore, the sensitivity and accuracy of tension measurement can be improved.

By selecting a magnetizer having at least one pair of permanent magnets spaced apart in the longitudinal direction of the magnetic element, facing each other with a different magnetic pole, the configuration can be rendered simple and small as compared to a configuration that magnetizes a magnetic element by means of a coil. An external power supply can be dispensed with, reducing constraint in the measurement location. Further, by dividing the magnetizer into a plurality of parts in the circumferential direction, the attachment and exchange with respect to a magnetic element that has already been installed can be facilitated. Further, a Hall element can be employed as the magnetic sensor.

In the case where the magnetic element takes a stranded wire structure having a plurality of filaments stranded, it is preferable to arrange a plurality of magnetic sensors along the circumferential direction of the magnetic element, and use the average of the output of each magnetic sensor for the detection value of the spatial magnetic field intensity. Accordingly, measurement error caused by variation in the distance from the strand depending upon the attached position of the magnetic sensor can be reduced to improve the measurement accuracy.

By the configuration set forth above, measurement of a target object at an arbitrary position in the longitudinal direction is allowed. Further, since measurement of a target object is allowed in a non-contacting manner, the present invention is applicable even in the case where the target object moves. Since the inherent nature of a magnetic element is taken advantage of usage of a particular material is not required for the measurement. The present invention is applicable to any magnetic element.

Effects of the Invention

Since the tension measurement apparatus of the present invention is configured to direct-current magnetize a portion of a long magnetic element that is the target object of measurement up to the range of approach to saturation magnetization, detect the spatial magnetic field intensity in the neighborhood of the surface of the magnetic element, greatly differing corresponding to stress variation, and measure the tension acting on the magnetic element from the detected value, a measurement result of superior reproducibility with high sensitivity can be obtained. The tension measurement apparatus can be applied even to a target object having a stranded wire structure.

MODES FOR CARRYING OUT THE INVENTION

Figure 1:
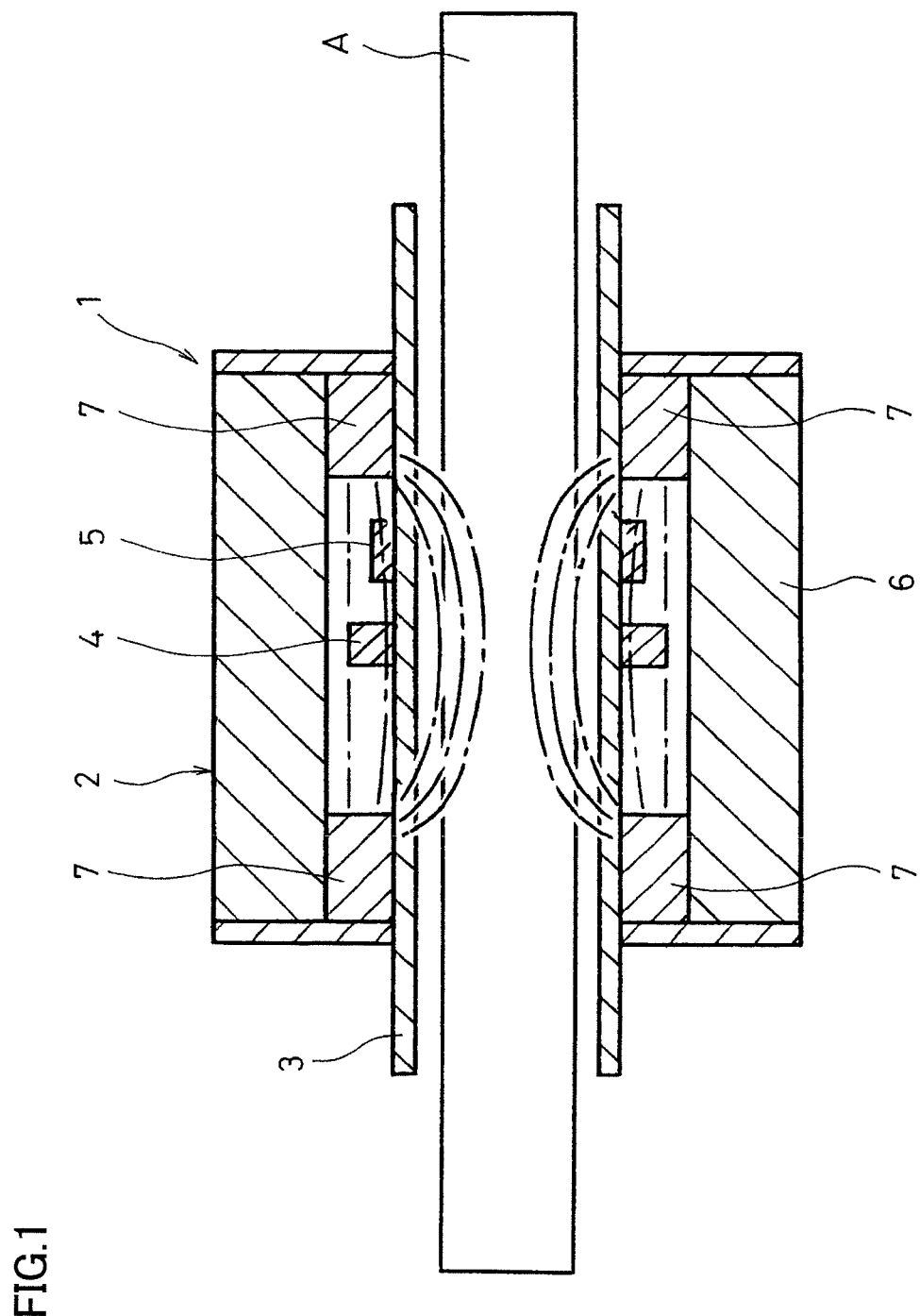
FIG. 1 is a schematic vertical cross sectional front view of a tension measurement apparatus according to an embodiment.

Embodiments of the present invention will be described hereinafter based on FIGS. 1 to 6. A tension measurement apparatus 1 of the present embodiment basically includes, as shown in FIG. 1, a cylindrical magnetizer 2 arranged to surround a portion of a long magnetic element A, a spacer 3 inserted between magnetizer 2 and magnetic element A, a Hall element 4 serving as a magnetic sensor detecting the spatial magnetic field intensity in the neighborhood of the surface of magnetic element A, and an amplifier 5 amplifying the output of Hall element 4.

Figure 2:
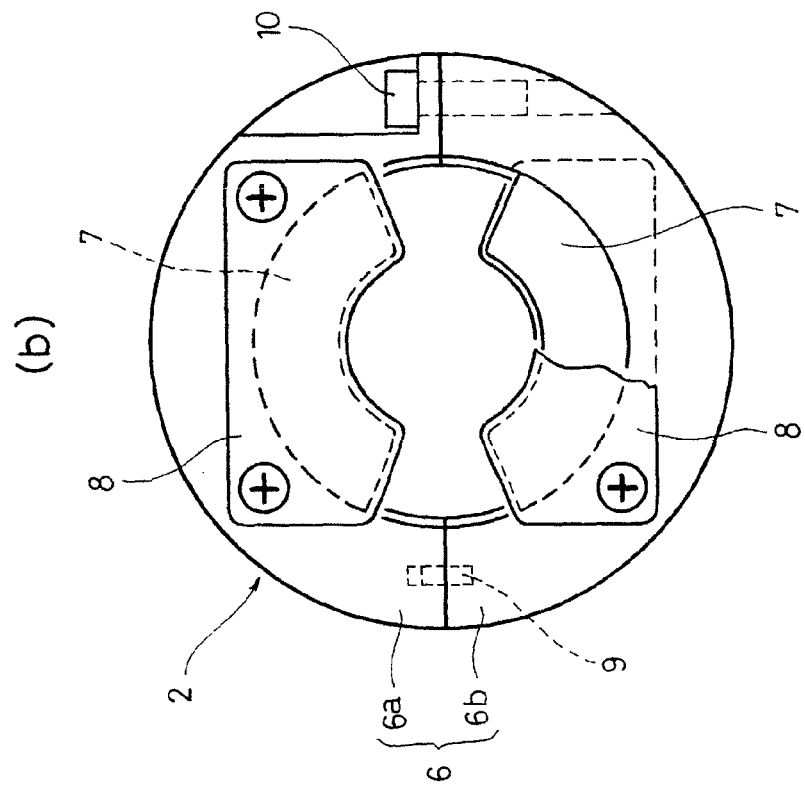
FIG. 2 represents the magnetizer of FIG. 1, wherein (a) is a vertical cross sectional front view and (b) is a side view of (a).
Figure 2:
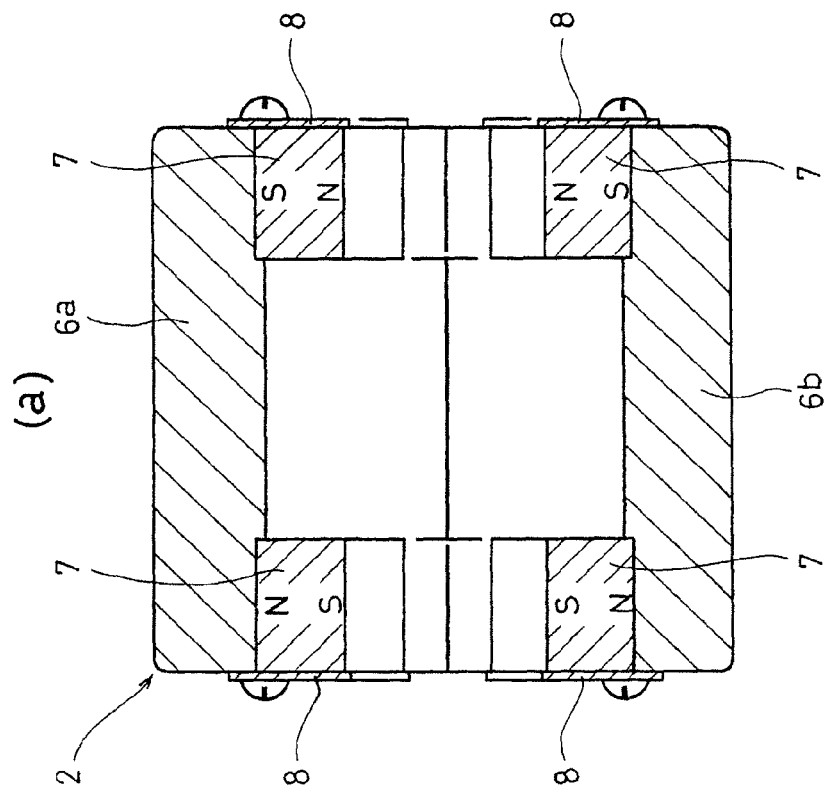

As shown in (a) and (b) of FIG. 2, magnetizer 2 includes four permanent magnets 7 constituting the shape of a portion of a cylinder, fixed by an adhesive to both ends at the inner circumference of a cylindrical steel yoke 6. A cover 8 spread over the outer end face of each permanent magnet 7 is attached to both end faces of yoke 6. Yoke 6 is divided into two yoke pieces 6a and 6b, each of a hemi-cylindrical shape, arranged integrally by a plurality of pins 9 inserted into yoke pieces 6a and 6b from one face of the divided pieces, and a plurality of bolts 10 screwed from the outer side of one yoke piece 6a into the other yoke piece 6b. One pair of permanent magnets 7 is provided for each of yoke pieces 6a and 6b. The two permanent magnets 7 constituting a pair are arranged spaced apart from each other in the longitudinal direction of magnetic element A, facing each other by different magnetic poles. Permanent magnets 7 function to direct-current magnetize a magnetic element A over a short range in the longitudinal direction up to the range of approach to saturation magnetization.

Spacer 3 is made of polyethylene, which is non-magnetic, divided into two along the circumferential direction, likewise with magnetizer 2. Spacer 3 is fixed by an adhesive to the inner circumferential side of each permanent magnet 7 to prevent contact between permanent magnet 7 and magnetic element A. In addition, spacer 3 has a plurality of Hall elements 4 and amplifiers 5 attached at the outer circumferential side, facing the inner circumferential surface of yoke 6.

Hall elements 4 are arranged equally spaced apart along the circumferential direction at the middle point of a pair of permanent magnets 7 at the inner circumferential side of magnetizer 2, i.e. in the vicinity of the central area in the longitudinal direction of the magnetic domain of magnetic element A. The output of each Hall element 4 is amplified by amplifier 5 to be sent to a data processor (not shown). The average value thereof is taken as the spatial magnetic field intensity in the neighborhood of the surface of magnetic element A, which is used for the measurement of tension acting on magnetic element A.

Figure 3:
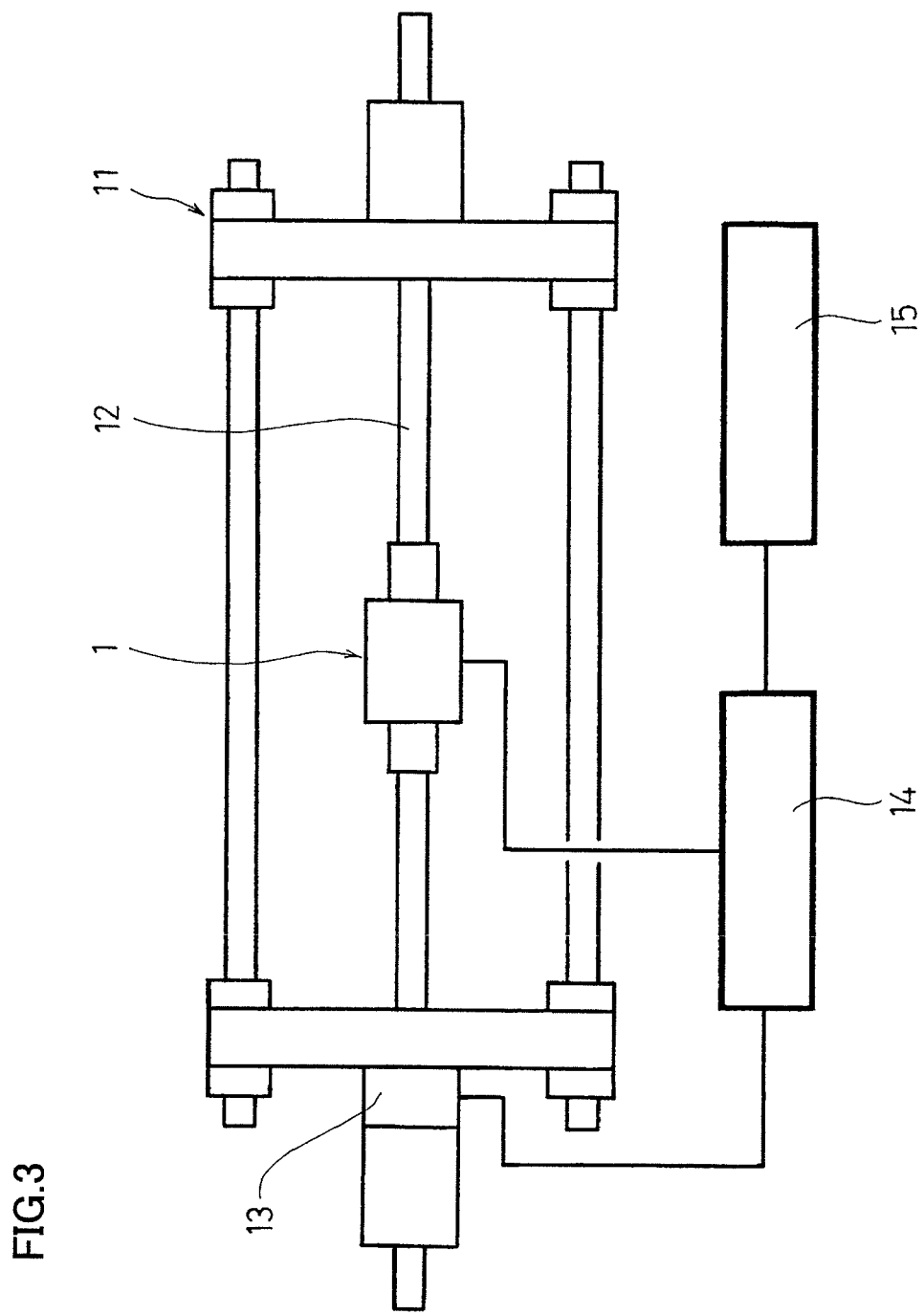
FIG. 3 is a diagram to describe the performance confirmation experiment of the measurement apparatus of FIG. 1.

An experiment to confirm the measurement performance of tension measurement apparatus 1 was carried out. In this experiment, as shown in FIG. 3, an epoxy strand (a PC steel strand of 15.2 mm in diameter coated with epoxy resin) 12 was set as a long magnetic element to a vertical type tension tester 11. Tension measurement apparatus 1 was attached at the central region of the tension load region. Load was repeatedly applied in accordance with the two sets of loading conditions set forth below. The outputs of a load cell 13 and tension measurement apparatus 1 were fed to a computer 15 via a data recorder 14, and the relationship therebetween was evaluated.

Figure 4:
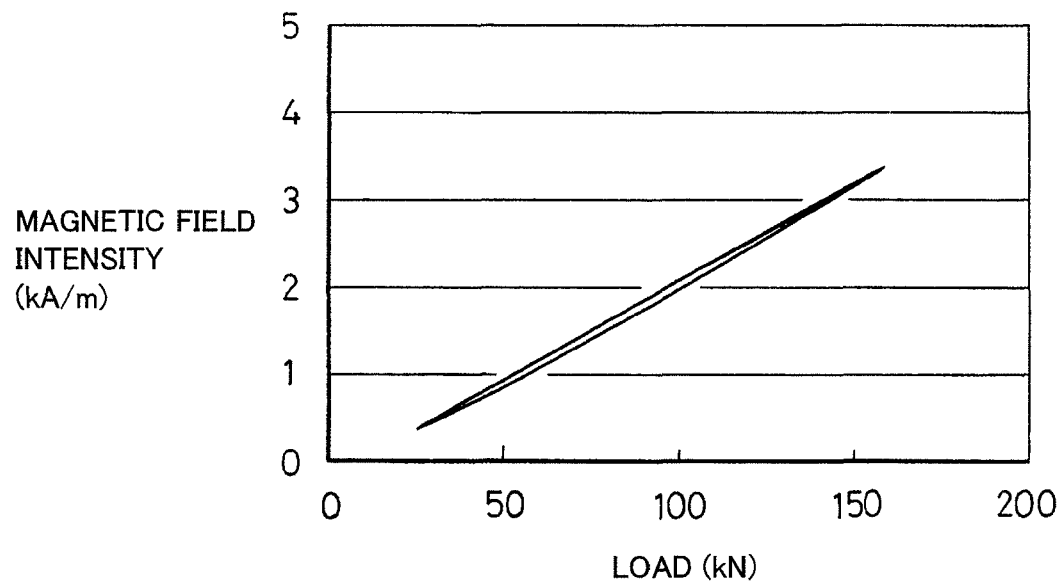
FIGS. 4(a) and (b) each represent graphs of the result of the performance confirmation experiment of FIG. 3.
Figure 4:
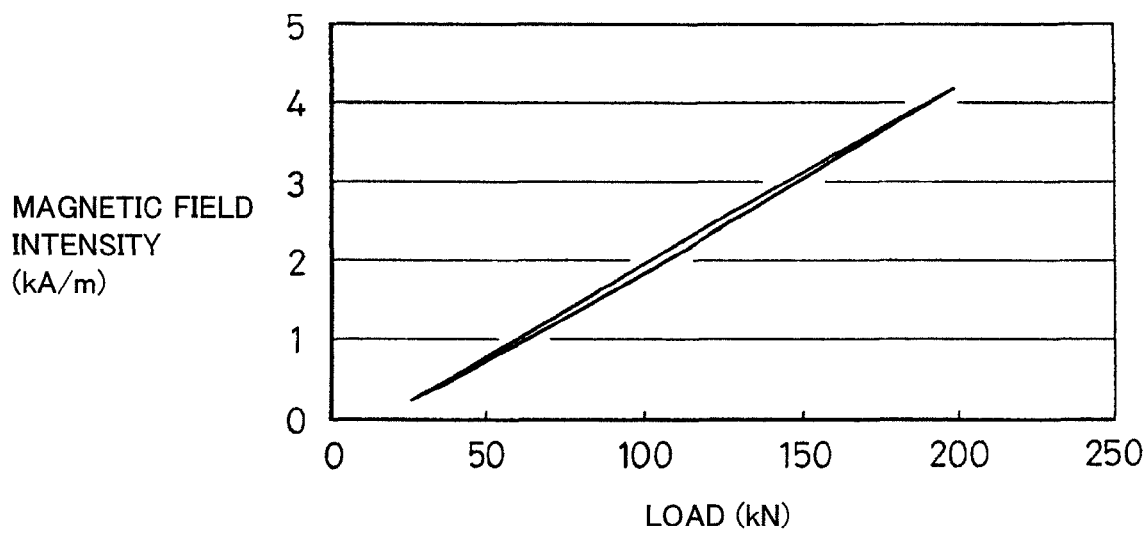

<Loading Condition 1>
Load weight: 21.6 to 156 kN
Loading method: manual
Repeated count: 5 times <Loading Condition 2>
Load weight: 21.6 to 200 kN
Loading method: sinusoidal waveform 0.002 Hz
Repeated count: 10 times The results of the experiments under loading conditions 1 and 2 are shown in (a) and (b), respectively, of FIG. 4. The load detected by load cell 13 and the magnetic field intensity detected by tension measurement apparatus 1 exhibited substantially a linear relationship, despite of a slight hysteresis. Variation caused by that hysteresis was approximately 5% at most. It was confirmed that the measurement performance is tolerable for practical usage.

Tension measurement apparatus 1 has a configuration and performance set forth above, and direct-current magnetizes a portion of a long magnetic element that will become the target object of measurement, up to the range of approach to saturation magnetization. A measurement result of superior reproducibility is obtained. No eddy current is generated at the target object. Tension measurement apparatus 1 is applicable to a target object of a stranded wire structure whose measurement result will readily vary under the effect of eddy current. Since the magnetic domain is shortened so as to increase the demagnetizing field developed within the target object, tension measurement of high sensitivity can be achieved by obtaining a great modification in the spatial magnetic field corresponding to stress.

Since permanent magnets 7 are employed as magnetizer 2 for magnetization of a target object, the configuration can be rendered simple and small as compared to that employing a coil. Moreover, restriction on the measurement position is low. Since magnetizer 2 and spacer 3 located at the inner circumference are divided into two along the circumferential direction, the measurement apparatus does not have to be installed at the same time of installing the target object. Attachment and exchange with respect to a member that has already been installed can be carried out readily.

Further, since an average value of the outputs of a plurality of Hall elements 4 arranged equally spaced apart along the circumferential direction of the magnetic element is employed as the detection value of the spatial magnetic field intensity, an error in the measurement of a magnetic element having a stranded wire structure with the distance between the strand and Hall element 4 varying depending upon the attached position of Hall element 4 is small. The measurement accuracy can be ensured.

Figure 5:
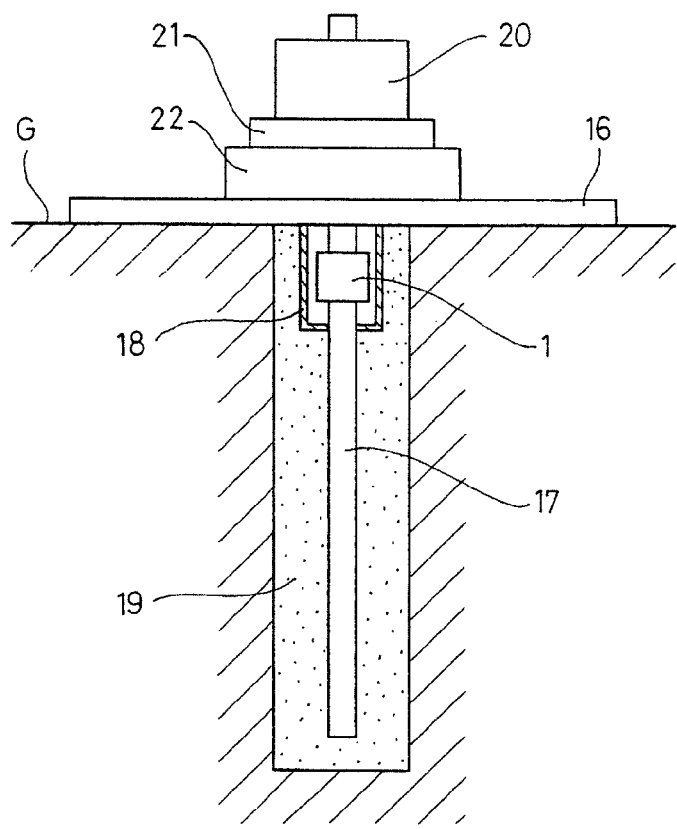
FIG. 5 is a vertical cross sectional front view representing an exemplified usage of the measurement apparatus of FIG. 1.

FIG. 5 represents an exemplified usage of a tension measurement apparatus 1 of the above-described embodiment. In this example, measurement is made of the tension of a PC strand (PC steel strand) 17 employed as a tension member to secure an anchor plate 16 on a slope G in a ground anchor installed on a slope. PC strand 17 is inserted into the ground from one end and secured by a grout 19 with a portion of the other end passing through an anticorrosion pipe 18. A fixture 20 attached to the terminal end of the other end of PC strand 17 presses anchor plate 16 towards slope G through two stages of spacers 21 and 22 for fixture. Tension measurement apparatus 1 is attached to PC strand 17 in anticorrosion pipe 18.

Figure 6:
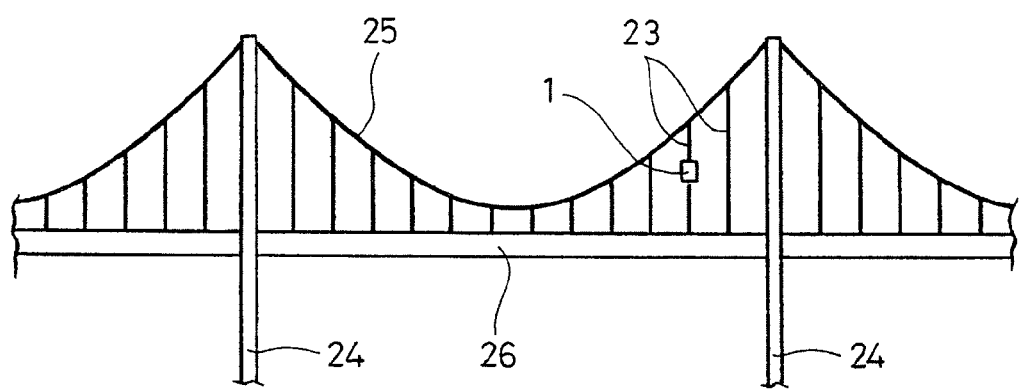
FIG. 6 is a schematic diagram to describe another exemplified usage of the measurement apparatus of FIG. 1.
Figure 7:
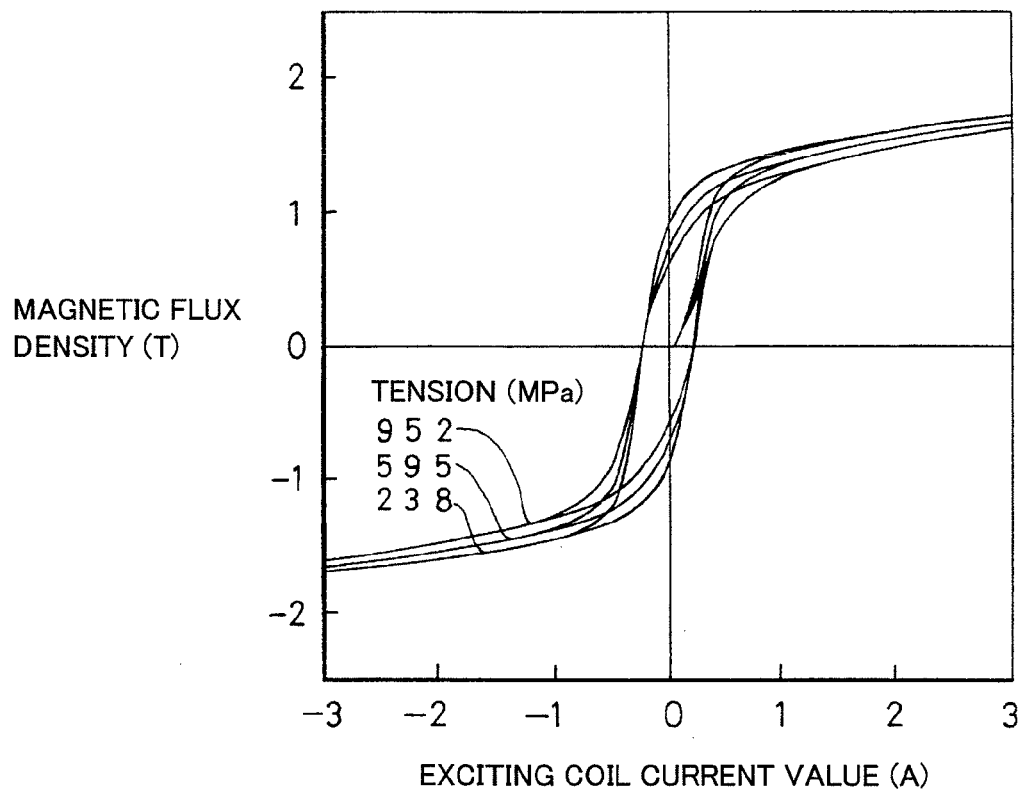
FIG. 7 is a graph representing an example of the magnetization property of a steel wire.
Figure 8:
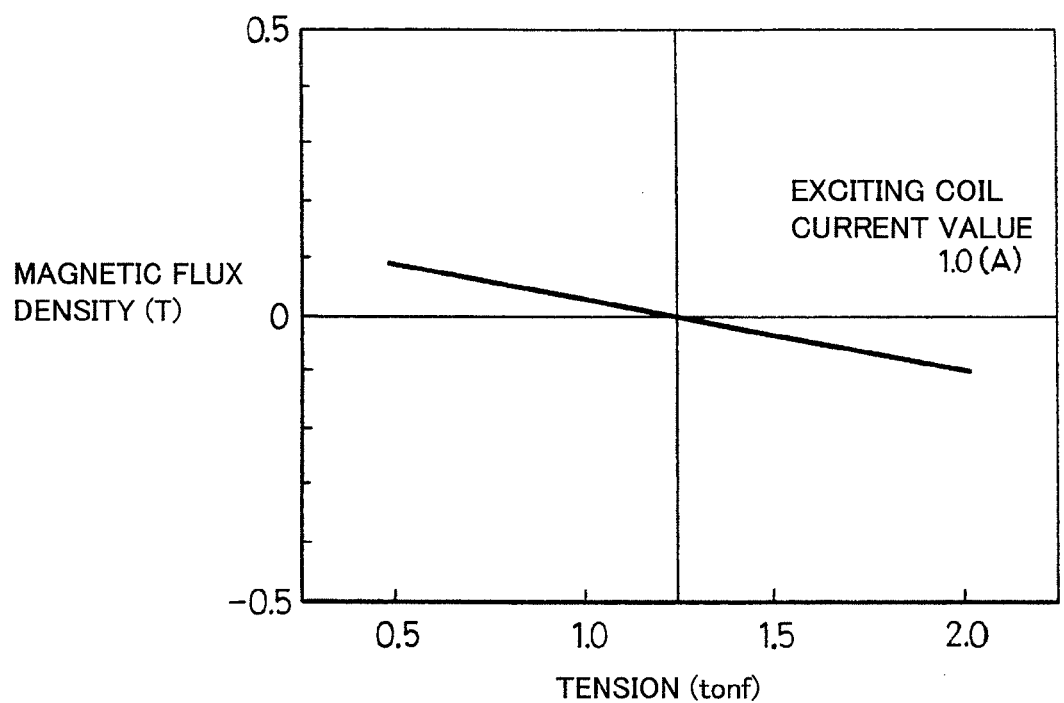
FIG. 8 is a graph representing variation in magnetization by the stress of the steel wire of FIG. 7.
Figure 9:
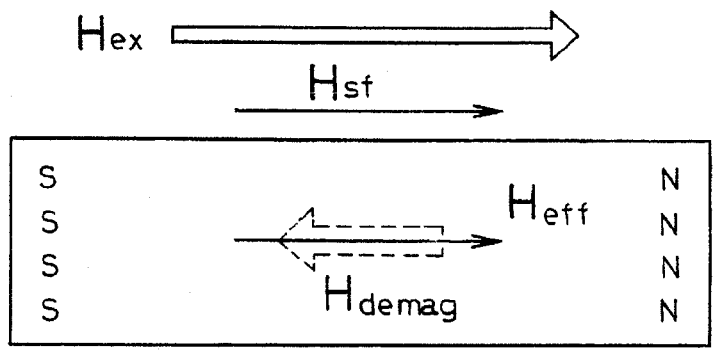
FIG. 9 is a schematic diagram of a magnetic field developed by magnetization of a magnetic element.
Figure 10:
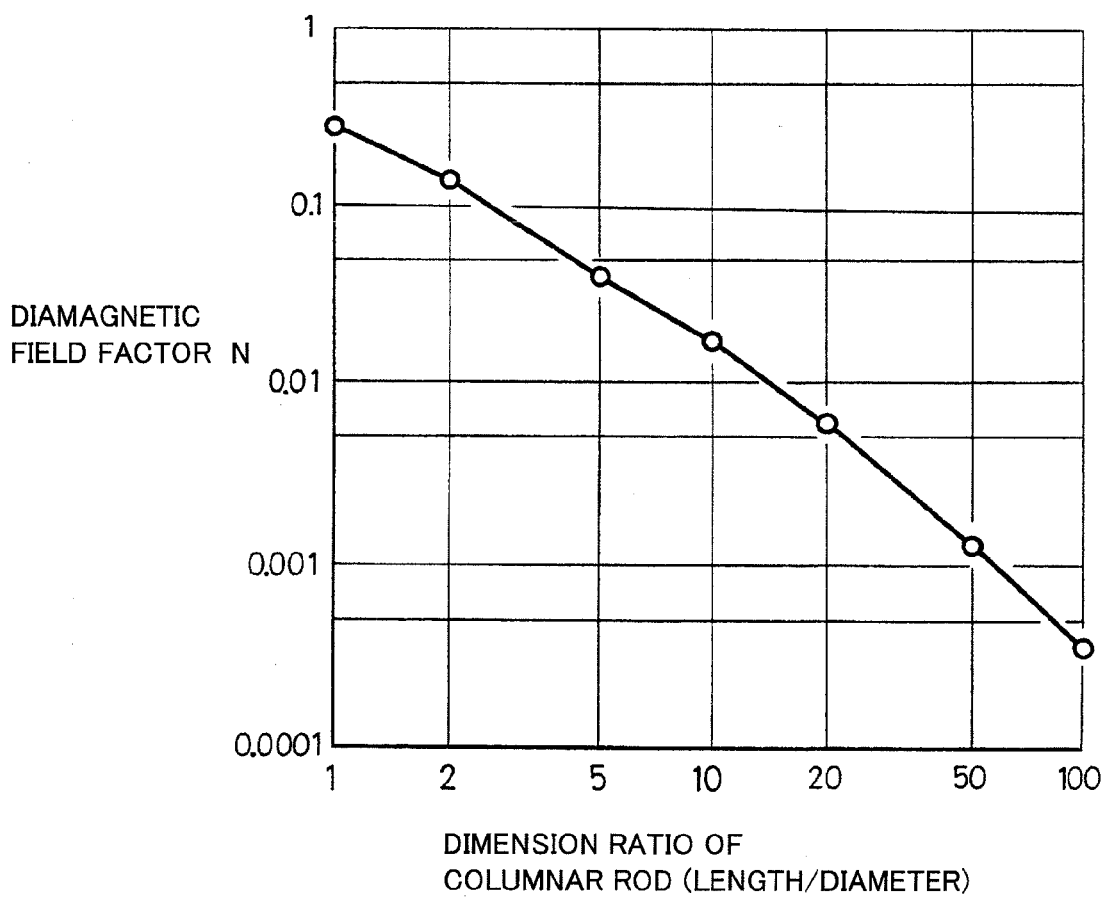
FIG. 10 is a graph representing the relationship between the dimension ratio of a columnar rod and the diamagnetic field factor.

FIG. 6 shows another usage example of tension measurement apparatus 1 of the present embodiment. In this usage example, the tension of a hanger cable 23 of a suspension bridge is measured. The suspension bridge has a main cable 25 tacked across a plurality of bridge piers 24. A bridge beam 26 is hanged by a plurality of hanger cables 23 pending from main cable 25. Tension measurement apparatus 1 is attached to one of hanger cables 23 in the vicinity of the center in the longitudinal direction.

For an element that is exposed outside such as the cable of a suspending structure or a wire rope of transport equipment, tension measurement apparatus 1 can be mounted to conduct measurement any time with the target object in an already-installed state. In the case where the tension measurement apparatus is to be installed at the time of newly installing a target object that is the subject of measurement, the magnetizer and spacer to be arranged at the inner circumference thereof do not necessarily have to be divided along the circumferential direction. These members may be passed through from the terminal of the target object.

It should be understood that the embodiments disclosed herein are illustrative and non-restrictive in every respect. The scope of the present invention is defined by the terms of the claims, rather than the description above, and is intended to include any modification within the scope and meaning equivalent to the terms of the claims.

For example, although a permanent magnet such as that set forth above in the embodiment is preferably employed for the magnetizer, direct-current magnetization may be effected with a coil. Furthermore, the magnetic sensor is not limited to a Hall element, and may be a Hall IC or the like that can detect the magnetic field intensity. Further, the target object includes any element of a rod shape, a unilinear wire, a stranded (monofilamentary wire) type, and a rope (multifilamentary wire), formed of a magnetic element.

Industrial Applicability

The tension measurement apparatus of the present invention can be used, not only for static tension measurement, but also for dynamic tension measurement. For example, in the aforementioned ground anchor and suspension bridge, not only the secular change of tension applied to the PC strand and cable, but also transient tension change caused when an earthquake occurs or the like can be measured.

Description of Reference Characters

1 tension measurement apparatus
2 magnetizer
3 spacer
4 Hall element
5 amplifier
6 yoke
6a, 6b yoke piece
7 permanent magnet
11 tension tester
12 epoxy strand
13 load cell
16 anchor plate
17 PC strand
18 anticorrosion pipe
19 grout
20 fixture
23 hanger cable
24 bridge pier
25 main cable
26 bridge beam
A magnetic element

The invention claimed is

1. A tension measurement apparatus for measuring a tension of a long magnetic element, comprising:
   a cylindrical magnetizer arranged to surround a portion of the magnetic element to direct-current magnetize the magnetic element in a longitudinal direction up to a range of approach to saturation magnetization, and
   a magnetic sensor arranged in proximity to said magnetic element at a central region in the longitudinal direction of a magnetic domain to detect a spatial magnetic field intensity in a neighborhood of a surface of said magnetic element,
   said tension measurement apparatus configured to measure tension acting on the magnetic element based on the spatial magnetic field intensity detected by said magnetic sensor,
   wherein said magnetic sensor is arranged at an inner circumferential side of said cylindrical magnetizer, and
   wherein said magnetizer includes at least a pair of permanent magnets facing each other by different magnetic poles, spaced apart along the longitudinal direction of the magnetic element, and the pair of permanent magnets being arranged to sandwich said magnetic sensor,
   wherein said cylindrical magnetizer is arranged so that a length of a magnetic domain has a ratio equal to or less than 3 to the diameter of said magnetic element.

2. The tension measurement apparatus according to claim 1, wherein said magnetizer is divided into a plurality of parts along a circumferential direction.

3. The tension measurement apparatus according to claim 1, wherein a Hall element is employed as said magnetic sensor.

4. The tension measurement apparatus according to claim 1, wherein
   said magnetic element takes a stranded wire structure having a plurality of filaments stranded,
   a plurality of magnetic sensors are arranged along a circumferential direction of the magnetic element, and
   an average of outputs from each of the magnetic sensors is used as a detection value of the spatial magnetic field intensity.

* * * * *